UNITED STATES PATENT OFFICE.

JOSEPH KOETSCHET, OF LYONS, FRANCE, ASSIGNOR TO LA SOCIÉTÉ CHIMIQUE DES USINES DU RHÔNE, ANCIENNEMENT GILLIARD, P. MONNET ET CARTIER, OF SAME PLACE.

INDIGO DYE AND PROCESS OF MAKING SAME.

SPECIFICATION forming part of Letters Patent No. 662,073, dated November 20, 1900.

Application filed June 3, 1899. Serial No. 719,298. (Specimens.)

*To all whom it may concern:*

Be it known that I, JOSEPH KOETSCHET, of Lyons, France, have invented certain new and useful Improvements in the Manufacture of Indigo Coloring-Matters and Intermediate Products, of which the following is a specification.

This invention relates to the manufacture of new indigo coloring-matters having the chemical constitution of methyl indigoes wherein the methyl group is in the meta position relatively to what was originally the aldehydic group and which for the sake of convenience is hereinafter referred to as the "aldehydic group," from meta-toluylic aldehyde, and to the production in a pure state of the intermediate chemical bodies employed in the said manufacture.

I have discovered that when meta-toluylic aldehyde is nitrated a mixture of nitro products is obtained varying in proportion according to the conditions of nitration, and from this mixture I have isolated two crystalline mono-nitro toluylic aldehydes, which under suitable treatment yield two isomeric methyl indigoes constituting the new indigo coloring-matters aforesaid.

The nitration of metra-toluylic aldehydes is preferably carried out under the following conditions in order to obtain the indigo yielding aldehydes; but these conditions may be varied. Two kilos meta-toluylic aldehyde are dissolved in twenty kilos concentrated sulfuric acid (ninety-eight per cent.) at a temperature of about 40° centigrade, and to this solution is added, with constant stirring, 1.44 kilo dry nitrate of soda. The temperature is maintained at 40° to 45° centigrade, and when the reaction is finished the nitrated mixture is poured upon ice. The oily mixture of nitro-aldehydes is separated by decantation, washed with water, a small quantity of nitro-toluylic acid, which is formed, removed by means of carbonate of soda, and the product again well washed with water. About two and one-half kilos crude nitro-aldehyde may thus be obtained. The crude nitration product is then fractionally distilled in vacuum, and at a pressure of two millimeters nearly the whole distils over between 135° and 145° centigrade. The first two-thirds of the distillate are collected apart and cooled to 0° centigrade, when a crystalline mass of a nitro-aldehyde is formed and removed from the mother-liquor by filtration at 0° centigrade. When pure, this product melts at 64° centigrade, (uncorrected.) The last third of the distillate is treated separately in a similar manner at 0° centigrade and furnishes a nitro-aldehyde, crystallizing in yellow needles, which when pure melt at 43° to 44° centigrade, (uncorrected.) The mother-liquors from these filtrations may be resubmitted to fractional distillation until no further crystals are obtained from the fractions even at a temperature of 10° centigrade. The nitro-aldehydes probably contained in the residues have not hitherto been obtained crystalline.

The method of separation from the crude nitrated toluylic aldehyde of the two crystalline nitro products, melting, respectively, at 64° centigrade and 44° centigrade, is merely given as typical and may be modified in detail as the proportions of these nitro products in the crude material may require. The difference between the two crystalline nitro toluylic aldehydes thus obtained is further demonstrated by the different compounds they yield with anilin, hydroxylamin, phenylhydrazin, &c., all of which have been prepared by me. Moreover, on gentle oxidation the nitro-aldehyde melting at 64° centigrade yields a corresponding acid melting at 218° to 220° centigrade, whereas the nitro-aldehyde melting at 44° centigrade yields an unknown acid, melting at 135° centigrade.

Both nitro-aldehydes combine with acetone under the influence of suitable condensation agents to form two ketones, which are not only isomeric, but also contain the methyl group in the meta position relatively to the aldehydic group. The same method is employed for the preparation of both these new isomerides and is substantially as follows: Five parts nitro-toluylic aldehyde are dissolved in an excess (about eight parts) of acetone, cooled to 0° centigrade, and there is added with constant agitation a solution of one and one-half parts caustic soda in one hundred parts water. When the operation (which occupies about thirty minutes) is completed, the mixture is acidified and the excess of acetone removed by distillation. The ketone remains as an oily mass, which becomes crystalline when purified by crystallization from ether, benzene, alcohol, or other solvent. In either case the yield of ketone is nearly theoretical, that from the 64° aldehyde melting at 78° to 79° centigrade and that from the 44° aldehyde at 104° centigrade. The two ketones thus obtained combine with bisulfite of sodium and when treated with dilute solutions of alkalies in presence of air (or other suitable oxidizing agent) are transformed into methyl indigoes distinguished by the different indigo hues with which they dye cotton goods. The transformation of the ketone from 44° aldehyde is, however, much more difficult to accomplish than the formation of indigo coloring-matter from the isomeric product.

Six parts of ketone melting at 104° centigrade (from nitro-toluylic aldehyde melting at 44° centigrade) is agitated in presence of air (or other suitable oxidizing agent) for several hours in one hundred parts of eight per cent. caustic-soda solution. When the operation is finished, the precipitated indigo coloring-matter is filtered, washed, and dried. It weighs about half the weight of ketone taken and dyes a reddish-violet shade.

The methyl indigo from the nitro-toluylic aldehyde melting at 64° centigrade is prepared with such facility that it is quite unnecessary to separate the intermediate ketone, and the manufacture of this indigo coloring-matter may be carried out in one operation, as follows: Five parts nitro-toluylic aldehyde melting at 64° centigrade are dissolved in ten parts acetone and one hundred and twenty-five parts of a two-per-cent. caustic-soda solution added and well agitated in the air. Instead of using acetone to bring the nitro-toluylic aldehyde into solution a watery solution of bisulfite may be used to dissolve the aldehyde, and the solution thus obtained is then treated with acetone and caustic soda, as above described. The precipitated indigo coloring-matter is filtered, washed, and dried. It dyes light tints a greenish shade and in heavier tints has a very pronounced copper-like reflection.

Both indigo coloring-matters are readily reduced by hydrosulfite of sodium and may be employed for dyeing purposes analogous to ordinary indigo.

In its unsulfonated form the new class of coloring-matter is in the form of a blue powder insoluble in water, alcohol, and acetone like ordinary indigo, but on dyeing in the vat in the same manner as ordinary indigo gives redder shades than ordinary indigo. In the sulfonated form it is soluble in water.

What I claim, and desire to secure by Letters Patent, is—

1. The method or process of producing indigo coloring-matters which consists in nitrating meta-toluylic aldehyde, isolating from the resulting product solid nitro-toluylic aldehyde, condensing said nitro-toluylic aldehyde with acetone in presence of an alkali, and treating said condensation product with an alkali in presence of an oxidizing agent, substantially as described.

2. The method or process of producing indigo coloring-matters, which consists in nitrating meta-toluylic aldehyde isolating from the resulting product nitro-toluylic aldehyde melting at about 44° centigrade (uncorrected,) condensing said nitro-toluylic aldehyde with acetone, and finally treating said condensation product with an alkali in presence of an oxidizing agent, substantially as described.

3. The method or process of producing indigo coloring-matters, which consists in nitrating meta-toluylic aldehyde, isolating from the resulting product solid nitro-toluylic aldehyde, treating said nitro-toluylic aldehyde with acetone in caustic-soda solution to condense said nitro-toluylic aldehyde with acetone, and finally treating said condensation product with caustic soda in presence of an oxidizing agent, substantially as described.

4. The method or process of nitrating meta-toluylic aldehyde, which consists in dissolving same in concentrated sulfuric acid at a temperature of about 40° centigrade and adding a nitrate to said solution, maintaining the temperature at 40° to 45° centigrade and separating from the resulting nitrated mixture solid nitro-toluylic aldehyde, substantially as described.

5. The method or process of nitrating meta-toluylic aldehyde, which consists in dissolving same in concentrated sulfuric acid at a temperature of about 40° centigrade and adding nitrate of soda to said solution, maintaining the temperature at 40° to 45° centigrade and separating from the resulting nitrated mixture solid nitro-toluylic aldehyde, substantially as described.

6. The method or process of isolating solid nitro-toluylic aldehyde from the crude nitrated product, which method consists in distilling the crude product fractionally *in vacuo* at a pressure of about two millimeters and temperature of 135° to 145° centigrade, and allowing to crystallize, substantially as described.

7. As a new product, the hereinbefore-described blue dyestuff, which can be produced from nitro-toluylic aldehyde, and which in its unsulfonated form is a blue powder insoluble in water, alcohol and acetone like ordinary indigo, but on dyeing in the vat in the same manner as ordinary indigo gives redder shades than ordinary indigo, and which dyestuff in its sulfonated form is soluble in water.

In witness whereof I have hereunto signed my name in the presence of two subscribing witnesses.

JOSEPH KOETSCHET.

Witnesses:
RODOLPHE PFISTER,
MARIUS VACHOUR.